Jan. 1, 1924
I. C. MORGAN
TOMATO CORING MACHINE
Filed Feb. 28, 1923
1,479,004
4 Sheets-Sheet 1
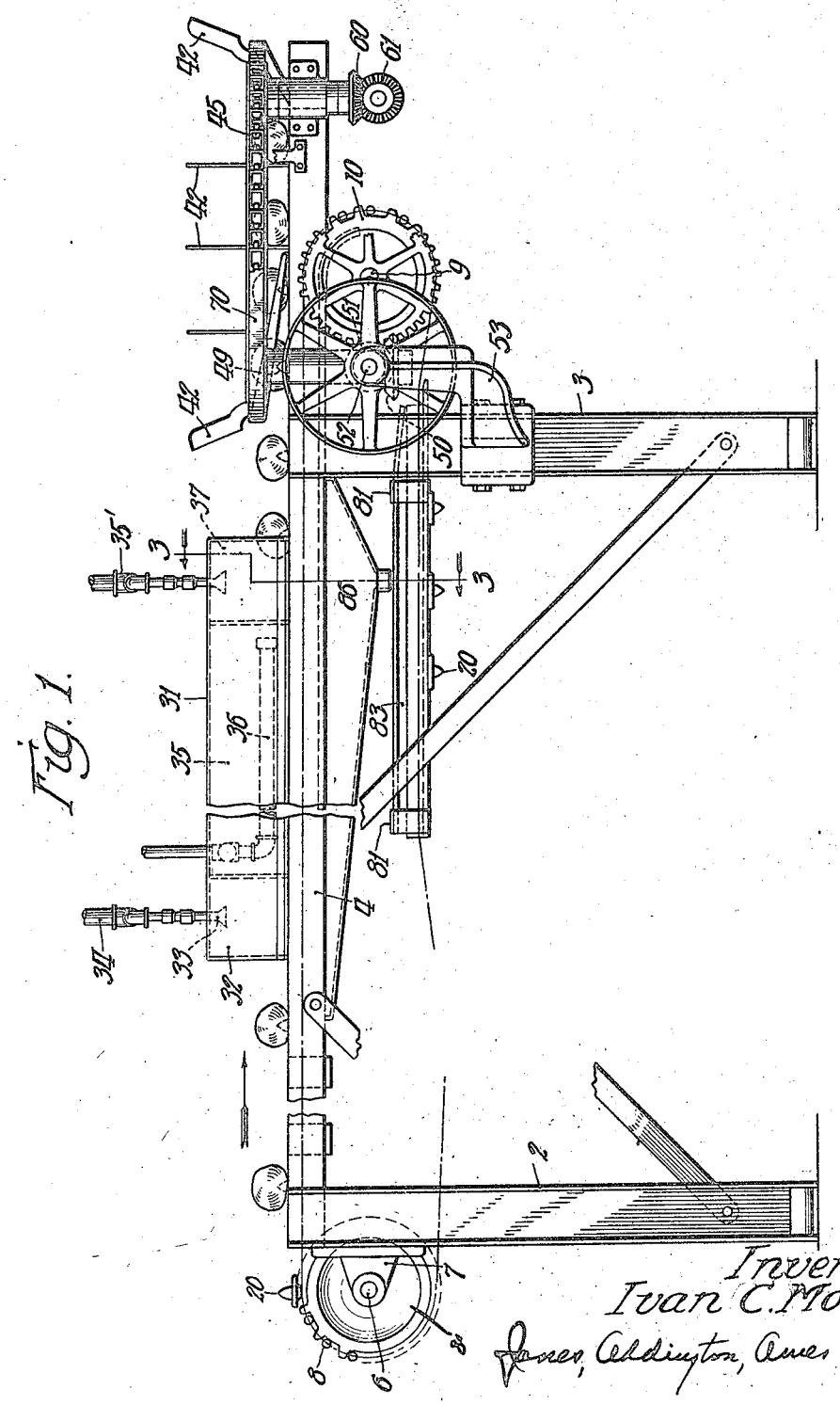
Inventor
Ivan C. Morgan

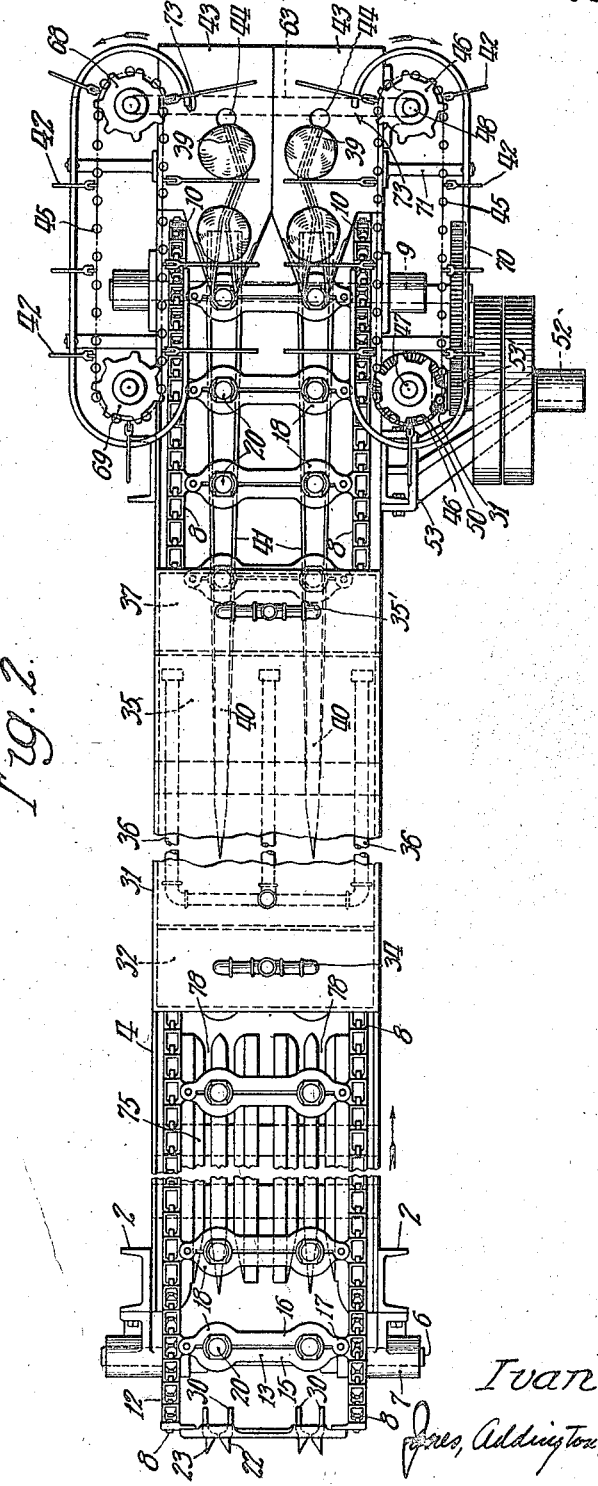

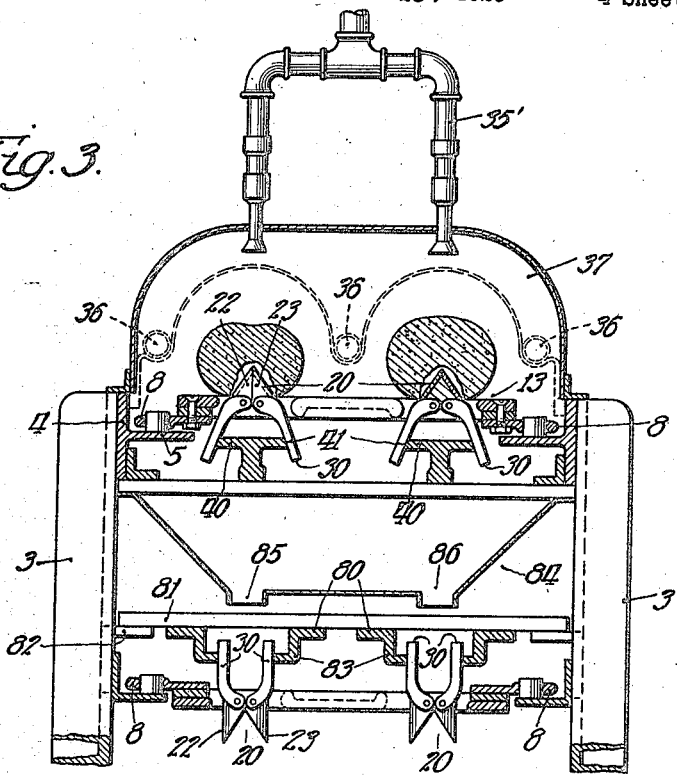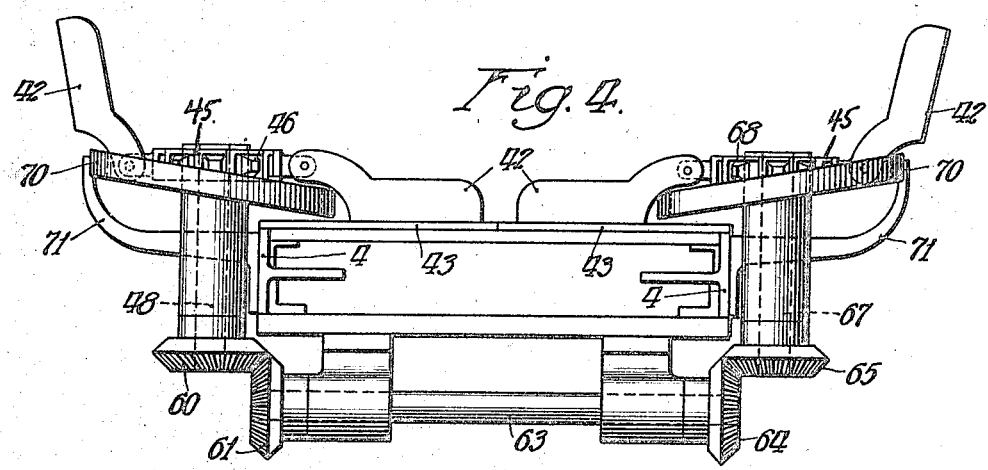

Jan. 1, 1924

I. C. MORGAN

TOMATO CORING MACHINE

Filed Feb. 28, 1923

1,479,004

Inventor.
Ivan C. Morgan.
Jones, Addington, Ames & Seibold
Attys.

Patented Jan. 1, 1924.

1,479,004

UNITED STATES PATENT OFFICE.

IVAN C. MORGAN, OF AUSTIN, INDIANA.

TOMATO-CORING MACHINE.

Application filed February 28, 1923. Serial No. 621,706.

*To all whom it may concern:*

Be it known that I, IVAN C. MORGAN, a citizen of the United States, residing at Austin, in the county of Scott and State of Indiana, have invented new and useful Improvements in Tomato-Coring Machines, of which the following is a full, clear, concise, and exact description, reference being had to the accompanying drawing, forming a part of this specification.

My invention relates to tomato coring machines.

More particularly my invention has reference to a machine which receives tomatoes or other similar fruit, at one end thereof, preferably in tandem relation, for carrying the fruit therethrough for a series of operations, after which it is discharged at the other end in washed, scalded and cored condition.

Briefly, my invention distinguishes from the prior art by an extremely simplified construction. It is commonly known that tomatoes contain an acid, which is destructive to certain metals, and which consequently tends to destroy a machine designed to prepare tomatoes for canning or preserving. To those skilled in the art, the life of such a machine is, therefore, relatively short. If the machine is intricate, not only is there a greater loss involved, but the life thereof is obviously decreased, due to a more rapid rate of destruction.

In preparing tomatoes, especially for canning, they are put through what is commonly known as a coring machine, which usually comprises a traveling carrier having a plurality of holders, on which the tomatoes are placed. Associated with the holders are one or more knives, which are actuated, during the course of travel of the carrier through the machine, for cutting or "nipping" out the core of the tomatoes. Heretofore in the art, difficulty has been experienced in properly arranging these knives, so that the seed cells are not punctured and the juice is not drained from the tomato. Further difficulty has been experienced in maintaining the fruit firm and whole, which is essential if it is to be used for canning. About the stem of the tomato the skin is usually green and hard, requiring the same to be removed, either during the coring operation, or at a later time when the tomatoes are peeled. In attempting to sever the green skin simultaneously with the coring operation, various means, of which those skilled in the art are well aware, have been provided, such as for example, knives of ogee cross section for scooping out the entire inner portion about the stem, including the flesh of the tomato, thereby puncturing each seed cell at this end and allowing a waste of juice. No method has been provided to regulate the amount removed from each tomato, with the result that larger tomatoes were insufficiently cored, while in smaller tomatoes the entire inner portion, including much of the seed cells, was wasted. If the tomatoes are hand peeled, the shape of the tomatoes is usually destroyed, especially if an attempt is made to remove this green portion manually.

Primarily, the object of my invention is to obviate the above disadvantages and includes the provision of an improved form of holder for the tomatoes, which holder constitutes the coring knives themselves. A further object is to provide first a cold water bath, then a scalding bath which penetrates the skins of the tomatoes, and finally a second cold water bath to crack said skins in order that peeling will be greatly facilitated, and the cost thereof lowered appreciably by reducing the number of hand peelers required. Another object of the invention is the provision of a novel form of trimming knives disposed in the path of the tomatoes, preferably at the discharge end of the machine, which knives function to slice off the entire green portion of the skin about the stem, without removing the meat or flesh of the tomatoes, irrespective of the diameter of the various tomatoes, or the shape or size of the face at the stem side. A further feature of the invention resides in the manner in which the coring knives, or holders, in this instance, are actuated. The tomatoes are securely held upon the holders, throughout their travel; these holders, however, being actuated at a certain point in said travel to loosen the cores, without disturbing the position of the tomatoes upon the holders, which holders as previously mentioned perform this coring operation. The following advantages are the result of my invention:

(A) Simplicity of construction by providing a minimum number of moving parts that come in contact with the tomatoes, thereby reducing to a minimum the possibility of destruction by the acid of the tomatoes;

(B) A simplified feeding operation which increases the capacity of a machine embodying my invention;

(C) Uniform washing and scalding of the tomatoes by a spraying action of the cold water and the steam;

(D) Uniformity in the coring operation, and the delivery of fruit in a firm and whole condition, without a loss of juice or unnecessary waste of the tomatoes; and (E) Decreasing the time required to prepare the fruit for canning or preserving by combining or performing simultaneously certain steps in the preparation of the fruit.

In order to apprise those skilled in the art how to construct and practice my invention, I shall now describe an embodiment of my invention, in connection with the accompanying drawings, which form a part hereof.

In the drawings—

Figure 1 is a side elevational view of a machine embodying my invention;

Fig. 2 is a top plan view of the same;

Fig. 3 is a transverse section of the machine, taken on line 3—3 of Fig. 1;

Fig. 4 is a fragmentary detail view of the discharge end of the machine, illustrating the manner in which moving arms operate to move the tomatoes past the trimming knives to this end of the machine;

Figure 5:
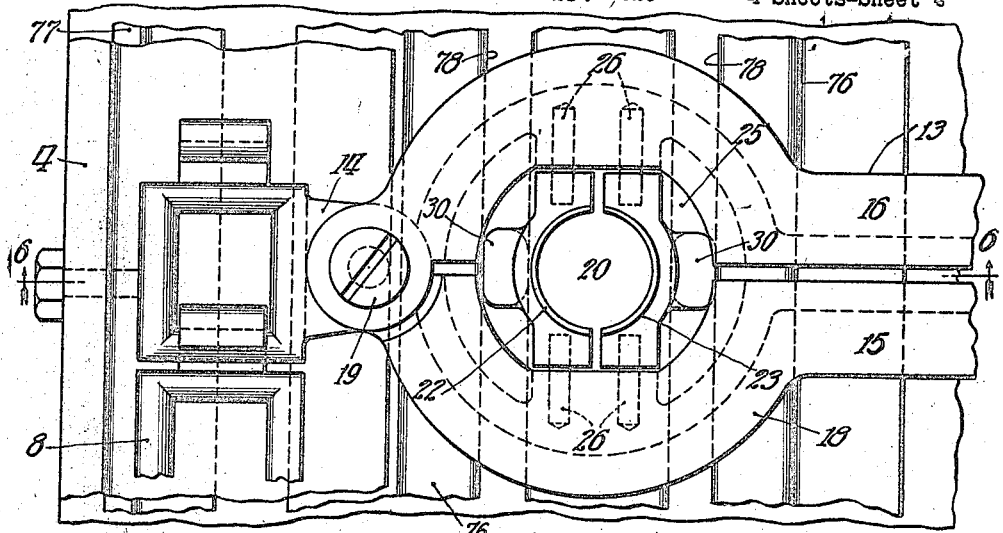
Fig. 5 is an enlarged fragmentary detail view of one of the holders or coring knives.

Referring more particularly to the drawings, the frame of the machine embodying my invention comprises a pair of front legs 2 and a pair of rear legs 3, which are connected by longitudinal T-irons 4. The longitudinal T-irons 4 are preferably arranged so as to have a horizontal leg 5 extending inwardly to the center of the machine, to form as will be later explained, a track for the traveling carrier on which the holders for receiving the fruit are mounted.

At the front or feeding end of the machine, a transverse shaft 6 is journaled in the bearing brackets 7. Spaced sprockets 8' are mounted near the ends of the shaft 6, over which sprockets endless carrier chains 8 are adapted to travel. At the opposite or discharge end of the machine, a similar transverse shaft 9 is mounted for carrying a second pair of spaced sprockets 10, also adapted to receive the endless carrier chains.

A traveling carrier 12 comprising the endless carrier chains 8 and cross plates 13, connected to these chains, is adapted to track upon the horizontal legs 5 of the T-irons 4. Certain of the links of the carrier chains 8 are provided with laterally extending lugs 14 to which are bolted the plates 13. The plates 13 comprise complementary members 15 and 16 having lugs 17 which overlap each other at each end, being apertured to receive bolts 19 for connecting the cross plates 13 to lugs 14 of the carrier chains 8. Apertured portions 18 are provided in the plates 13, preferably in tandem relation, and in these apertured portions 18, holders or coring knives 20 are suitably mounted.

These holders or coring knives 20 are adapted to receive the fruit, such as tomatoes, in the present instance, at the receiving end of the machine, and, as will be later explained, are adapted to carry the tomatoes to the discharge end of the machine where they are removed and passed over trimming knives for removing a certain portion of the skin about the portion cored.

Figure 6:
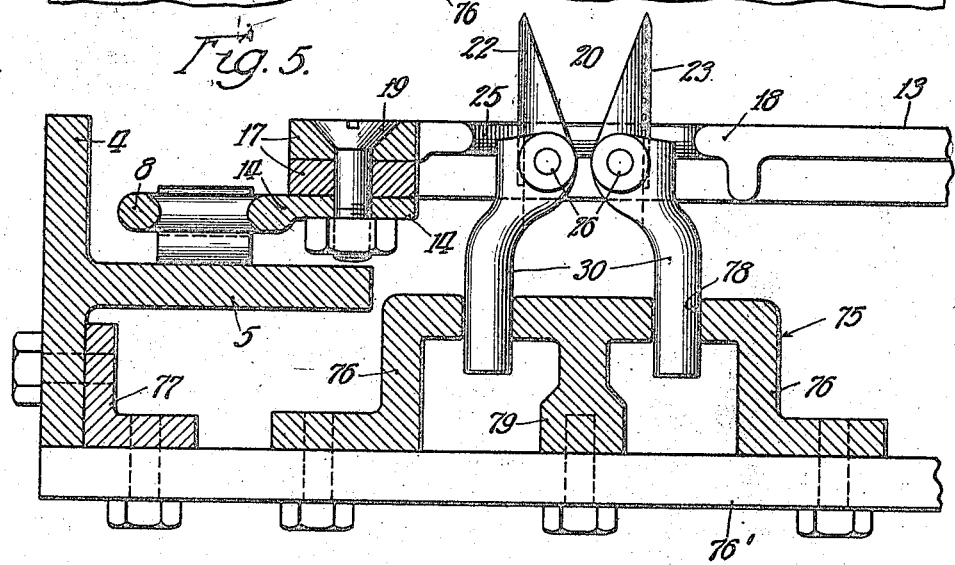
Fig. 6 is a sectional view of the same, taken on line 6—6 of Fig. 5.

As will be seen in Figs. 5 and 6, the coring knives 20 comprise a pair of separately pivoted cutting members 22 and 23, suitably mounted in the apertured portion 18. The portion 18 is preferably provided circular with the central opening 25 therein. The cutting members 22 and 23 are arranged transversely to the complementary members 15 and 16 of the cross plate 13. Each cutting member is separately pivoted by a pair of pins 26. Each complementary member is adapted to receive one of the pins of each pair, so that the cutting members will be pivoted in a transverse plane with respect to the machine. The cutting members 22 and 23 may be of any preferred construction, but as I have shown, they comprise removable cutters carried in downwardly extending members 30. The tomatoes are preferably mounted upon the cutting knives while in open position, this position being shown in Fig. 6. When the tomatoes are cored, the lower ends of the members 30 are spread in order to bring the upper cutting members together in closed position. When the cutting members are in closed position, they preferably form a cone, and therefore, in coring the tomatoes remove a conical portion therefrom. This is not essential to the essence of my invention, but in practice it has been found preferable to economize in coring tomatoes and remove only that portion of the center of the tomatoes, namely the core, which is objectionable when they are canned.

In order that the coring knives or cutting members 22 and 23, which comprise the same, are in open position when the tomatoes are placed thereon, at the feeding end of the machine, a plurality of tracks 75 for guiding the lower ends of the members 30 in passages 78, have been provided. The tracks 75 are carried upon the frame of the machine by a cross bar 76' connecting to the frame members 4 by means of angle irons 77. Each track 75 comprises two outer members 76 having a middle member 79 disposed therebetween, and so spaced that the passages 78 are formed. Passages 78 are so spaced apart that when the lower ends of the members 30 ride therein, the cutting knives 22 and 23 will be moved about their pivotal point to open position. Tomatoes may then be placed thereon for coring. It is to be noted that inasmuch as the passages 78 are fixed by the rigid mountings of the members 76 and 79 forming the tracks 75, the cutting members 22 and 23 are opened a predetermined distance, which has been ascertained through experiment to be that which will permit each time a minimum amount to be removed from the tomatoes, and yet efficiently core the same.

An enclosure 31 is mounted over the machine, preferably connecting to the side members thereof. This enclosure 31 is provided with a plurality of compartments or chambers for washing, scalding and cracking the skins of the tomatoes. At the forward end of the enclosure a chamber 32 is provided so that upon entering the enclosure the tomatoes will be washed by a spray of cool water discharging from the nozzle 33 of the piping 34. Upon being washed, the tomatoes are passed into a second chamber 35, in which a plurality of longitudinal steam pipes 36 are disposed, so that jets of steam will be directed towards each side of the tomatoes, as shown in Fig. 3, for scalding the same. Upon being scalded, the tomatoes are passed into a third chamber 37 for a cold water bath, which is intended to crack the skins for facilitating the peeling thereof at a later period in the preparation of the tomatoes for canning, preserving, or the like. The cold water bath is obtained by the use of any suitable piping 35′ for directing the cold spray of water into the compartment 37. While I have explained with great particularity the sequence of steps employed in this instance to treat the skins of the tomatoes, it is to be understood that other forms of treatment may be provided and come within the scope of this invention.

As the tomatoes are scalded and the skins thereof cracked by the cold water bath in the chamber 37, the coring of the tomatoes is simultaneously performed. This is accomplished by providing a pair of spaced longitudinal camming or spreading members 40, arranged to enter between the lower ends of members 30 of the coring knives for spreading the same and for closing the cutting members 22 and 23. Thus it will be seen that these members will nip or pinch the core loose from the tomato, the core being held within the cutting members so that it will be removed from the tomato when the tomato is placed upon trimming knives, as will later be explained. The spreading members 40 are preferably provided pointed at their forward ends, gradually widening with outwardly tapering sides 41, as shown in Fig. 3, which sides 41 during the closing of the coring knives engage the inner sides of the members 30. It is to be noted that the angle of these tapering faces 41 will vary according to the spread of the members 30, as they are moved apart to close the cutting members 22 and 23. As shown in the drawings the coring operation is performed simultaneously with the scalding and skin cracking operations, so that an economy of time and a simplified arrangement are obtained.

As the coring knives carry the tomatoes to the discharge end, a series of pivotal members 42 drop in back of the tomatoes to engage the same, and as the tomatoes reach the end of their travel on the carrier 12, the pivotal members 42 will continue the movement of the same over a pair of trimming knives 43, stationarily mounted on the frame of the machine.

Each trimming knife is provided with a cutting groove 39, preferably of a zigzag formation, so that after the tomato has been moved over the mouth of the trimming knives, the remaining portion of the grooves 39 will function to first cut the green skin on one side and then on the other side, by virtue of its zigzag formation. At the end of each groove 39, a circular opening 44 is provided, so that whatever skin that has been cut and is still clinging to the tomato, will free itself by dropping through the opening 44.

The pivotal members 42 are preferably provided on each side of the machine. A carrier chain 45 of the endless type is trained around horizontal sprockets 46 carried upon vertical shafts 47 and 48. The shaft 47 is preferably journaled in a sleeve 49 carried upon one side of the frame of the machine. At the lower end of shaft 47 a bevel gear 50 is provided. This bevel gear is adapted to mesh with a second bevel gear 51 carried upon a drive shaft 52. Drive shaft 52 is suitably journaled in the bracket 53 carried upon the frame of the machine. Upon this power shaft 52 a driving pulley and a loose pulley are provided for receiving a belt extending from any suitable source of power (not shown). Also mounted upon the power shaft 52 is a spur gear 53′ which meshes with a gear 54 on the transverse shaft 9 for driving the same. The sprockets 10 being mounted upon this transverse shaft 9, will drive the endless chains 8. The endless chains, as before explained, are part of the traveling carrier 12, and therefore, through the power mechanism just described will serve to drive this traveling carrier.

The endless chain 45 carrying the movable members 42 is driven by means of the sprockets 46 on the shafts 47 and 48. In order that the endless chain 45 on the opposite side of the machine may be driven in a similar manner, the vertical shaft 48 carrying sprocket 46 is provided at its lower end with a bevel gear 60, meshing with the bevel gear 61 fixed upon a transverse shaft 63. The transverse shaft 63 is suitably journaled upon the frame of the machine, and at its opposite end is provided with a second bevel gear 64, meshing with the bevel gear 65 on a vertical shaft 67, as shown in detail in Fig. 4. The vertical shaft 67 is journaled upon the frame of the machine in a manner similar to the vertical shaft 48, having at its upper end a sprocket 68 receiving the endless chain 45. At the opposite end, the endless chain 45 travels around a sprocket 69, mounted in a manner similar to the sprocket 46.

The members 42 are pivoted in a vertical plane on the chains 45, but are restricted in their movement in this plane by inclined tracks 70. The tracks 70 are suitably carried upon the frame of the machine, by means of brackets 71, shown in Fig. 4, but however are not continuous like the chains 45, being provided instead with openings 73 therein where the members 42, in passing, are allowed to rest upon the cutting knives 43. Upon approaching the end of each opening 73, the members 42 mount the inclined tracks 70, and as moved therealong by the chains 45, raise themselves to a vertical position, as clearly shown in Fig. 4. When reaching the other end, the tracks 70 allow the members 42 to lower themselves so as to engage the tomatoes after they have been placed upon the trimming knives 43 by the holders 20 passing thereunder and allowing the trimming knives to fork the tomatoes. Thereupon the members 42 will engage the tomatoes and force them in sliding relation over the trimming knives. Upon being forked by the trimming knives, a portion of the green skin is pierced in order to initiate the trimming operation, which is thereafter completed by the movement of the tomatoes over the cutting grooves 39.

Having now described the manner in which the tomatoes pass through the machine and are removed from the coring knives onto the trimming knives, and then trimmed, I shall now describe the mechanism provided for disposing of the core from the cutting members 22 and 23. As the traveling carrier moves around the sprockets 10 at the discharge end of the machine and travels forwardly on the under side to the feeding end of the machine, the lower ends of members 30 pass between a plurality of knife opening tracks 80 carried upon the machine by a cross bar 81 which is secured to the frame by angle irons 82, as shown in Fig. 3. Each track 80 consists of a pair of spaced members 83 adapted to receive the outer ends of the members 30 therebetween in order to bring these ends together and effect the spreading of the cutting members 22 and 23. Prior to this period in the operation, the cutting members 22 and 23 were closed with the core confined therein. Upon engaging the knife opening tracks, the members 22 and 23 are thrown apart, and being in inverted position, the core confined therein will be permitted to drop thereout of. Any desired receptacle (not shown) may be provided on the floor under the machine to receive the core.

In order to insure proper cleaning of the coring knife, when thus actuated to open position by engaging knife opening tracks 80, the drain water from the chambers 32 and 37, and the condensed steam from the chamber 35, are permitted to flow over the coring knives as shown in detail in Fig. 3. This is accomplished by providing a drain pan 84 directly below said chambers having openings 85 and 86 at the lower end thereof, each opening preferably lying directly over the path of the coring knives.

I wish to point out that it is not necessary to core the tomatoes simultaneously with the washing, scalding and cracking of the skins thereof, or that it is necessary to core the tomatoes before the green skin has been removed from about the stems. Any arrangement of the various steps involved may be had, and is contemplated within the scope of this invention.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. In a machine of the class described, a traveling carrier, holders on said carrier adapted to receive the articles to be cored, said holders comprising coring means for coring the articles thereon, and means for actuating said holders.

2. In a machine of the class described, a traveling carrier, holders on said carrier adapted to receive the articles to be cored, said holders comprising pivotal knives serving as coring means, and means for actuating said knives.

3. In a machine of the class described, a traveling carrier, holders on said carrier adapted to receive the articles to be cored, and means for actuating said holders for effecting the coring of said articles.

4. In a machine of the class described, a traveling carrier, a pair of coring knives on said carrier adapted to receive the articles to be cored, and means for actuating said coring knives after the articles are placed thereon.

5. In a machine of the class described, a traveling carrier, a pair of pivotally mounted coring knives adapted to receive the articles to be cored, and means for actuating said coring knives after the articles are placed thereon.

6. In a machine of the class described, a traveling carrier, a plurality of holders arranged in tandem on said carrier and adapted to receive the articles to be cored, said holders comprising pivotal knives for performing the coring operation upon said articles.

7. In a machine of the class described, a traveling carrier comprising carrier chains and connecting cross members, pivotally mounted coring knives on said cross members arranged in tandem relation, said coring knives adapted to receive while in non-coring position the articles to be cored, and means for closing said coring knives to sever the cores from said articles.

8. In a machine of the class described, a traveling carrier having an upper and a lower run, holders on said carrier, said holders comprising coring knives adapted to receive while in non-coring position the articles to be cored, and means disposed along the upper run of said traveling carrier for actuating said coring knives.

9. In a machine of the class described, a traveling carrier comprising carrier chains and connecting cross members, pivotally mounted coring knives on said cross members arranged in tandem relation, said coring knives adapted to receive the articles to be cored, and means for actuating said coring knives after said articles are placed thereon.

10. In a machine of the class described, a traveling carrier comprising carrier chains and connecting cross members, pivotally mounted coring knives on said cross members, and means for actuating said coring knives.

11. In a machine of the class described, a traveling carrier comprising carrier chains and connecting cross members, pivotally mounted coring knives on said cross members, and stationary means on the machine for actuating said coring knives.

12. In a machine of the class described, a traveling carrier comprising carrier chains and connecting cross members, pivotally mounted knives disposed in pairs on said cross members, means for opening and closing said knives, said knives adapted to receive while open the articles to be cored and to core the articles while being closed, and means for thereafter removing the cored articles from said knives.

13. In a machine of the class described, a traveling carrier, a pair of pivotally mounted knives on said carrier serving as a holder for the articles to be cored, means for actuating said knives, said knives adapted to receive while in non-actuated position said articles and to core the articles upon being actuated, and means for thereafter removing the cored articles from said knives.

14. In a machine of the class described, a traveling carrier, a pair of pivotally mounted knives on said carrier serving as a holder for the articles to be cored, means for actuating said knives, said knives adapted to receive while in non-actuated position said articles and to core the articles upon being actuated, means for thereafter removing the cored articles from said knives, said means comprising a plurality of traveling members adapted to receive the cored articles for moving them to the discharge end of the machine.

15. In a machine of the class described, a traveling carrier, a series of pivotally mounted knives on said carrier for receiving and then coring the articles, and means comprising a plurality of traveling members for swinging into the path of said knives whereby the cored articles will be moved to the discharge end of the machine.

16. In a machine of the class described, a series of pivotally mounted knives for receiving and then coring the articles to be cored, and a plurality of traveling members cooperating with said knives to discharge the articles from the machine when cored.

17. In a machine of the class described, a traveling carrier, a series of pivotally mounted knives on said carrier for receiving and then coring the articles to be cored, and mechanism for continuing the movement of the articles after cored to the discharge end of the machine, said mechanism comprising a plurality of members adapted to drop in back of the articles while on said knives for assisting in their removal from the knives and for carrying them forward to said discharge end.

18. In a machine of the class described, a traveling carrier, a series of pivotally mounted coring knives adapted to receive the articles to be cored, said knives being arranged in tandem relation on said carrier, and means at each side of the discharge end of the machine for removing the cored articles from said coring knives and for discharging them from the machine.

19. In a machine of the class described, a traveling carrier, a series of pivotally mounted coring knives adapted to receive the articles to be cored, parallel plates forming part of said traveling carrier for carrying said coring knives in pairs thereon, each knife comprising oppositely disposed cutting members separately pivoted to the parallel plate upon which they are mounted.

20. In a machine of the class described, a pivotally mounted coring knife comprising oppositely disposed cutting members, said cutting members having an open position and a closed position, means for carrying each cutting member in separate pivotal relation so that the lower ends thereof may be spread or closed to effect a coring operation and the discharge of the core from the cutting members, and means for spreading and closing the lower ends of said cutting members.

21. In a machine of the class described, a pivotally mounted coring knife adapted to receive while in open position the article to be cored and to core the article upon being moved to closed position, said coring knife comprising a pair of oppositely disposed separately pivoted cutting members having their lower ends extending below their point of pivotal support, and means for closing and for spreading said lower ends to effect said open position and said closed position respectively of said coring knife.

22. In a machine of the class described, a traveling carrier, a series of pivotally mounted coring knives adapted to receive the articles to be cored, parallel plates forming part of said carrier for carrying said coring knives thereon, each knife comprising oppositely disposed cutting members separately pivoted to the parallel plate upon which they are mounted.

23. In a machine of the class described, a traveling carrier, a series of pivotally mounted coring knives adapted to receive the articles to be cored, and parallel plates forming part of said carrier for carrying said coring knives thereon.

24. In a machine of the class described, a travelling carrier, a series of pivotally mounted coring knives adapted to receive the articles to be cored, parallel plates forming part of said carrier for carrying said coring knives thereon, each knife comprising cutting members pivoted to the parallel plate upon which they are mounted.

25. In a machine of the class described, a plurality of holders for receiving tomatoes or the like, means for moving said holders along the frame of said machine, and a plurality of trimming knives disposed in the path of said holders whereby when said holders advance thereto the tomatoes are placed thereon, the cutting edges of said knives following a path of sharp angular turns in alternating directions whereby portions on each side of the center of the tomatoes are removed thereby when moving thereover.

26. In a machine of the class described, coring knives comprising pairs of pivotally mounted cutting members arranged in tandem relation on a traveling carrier.

27. In a machine of the class described, a coring knife comprising a pair of pivotally mounted cutting members, each member being carried by a pair of aligned pivot pins.

28. In a machine of the class described, a coring knife comprising a pair of pivotally mounted cutting members, each member being carried by a pair of aligned pivot pins, and means for bringing the upper ends of said members together to remove a conically formed portion from the article to be cored.

29. In a machine of the class described, carrier chains having laterally formed lugs on certain of the links thereof, cross members secured to said lugs, apertured portions on said cross members, and a pair of cutting members forming a coring knife in each of the apertured portions.

30. In a machine of the class described, carrier chains having laterally formed lugs on certain of the links thereof, cross members secured to said lugs, apertured portions on said cross members, and a coring knife carried by said cross members in said apertured portions.

31. In a machine of the class described, carrier chains having laterally formed lugs on certain of the links thereof, cross members secured to said lugs, apertured portions on said cross members, coring knives carried by said cross members in said apertured portions, and camming means stationarily fixed on the machine for operating said coring knives.

32. In a machine of the class described, carrier chains having laterally formed lugs on certain of the links thereof, cross members secured to said lugs, apertured portions on said cross members, coring knives carried by said cross members in said apertured portions, camming means for actuating said coring knives to perform a coring operation, and means for opening said coring knives after the coring operation to permit removal of the cores from the knives.

33. In a machine of the class described, a traveling carrier comprising parallel cross members each provided with a pair of apertured portions, coring knives disposed in said apertured portions, and a pair of parallel cam members each arranged to actuate one of the knives carried by each cross member.

34. In a machine of the class described, a traveling carrier comprising parallel cross members each provided with a pair of apertured portions, coring knives disposed in said apertured portions, cam members arranged to actuate each of the knives carried by each cross member for performing a coring operation, and similarly disposed members on the under side of said machine functioning to cause displacement of the cores from said knives.

35. In a machine of the class described, a traveling carrier upon which a series of holders are placed for receiving the articles to be cored, an enclosure over a portion of the run of said carrier, said enclosure being divided into a plurality of compartments through which the articles are passed, means for permitting a cold water wash of the articles in one compartment, a scalding of the articles in another compartment and then a second cold water wash of the articles for cracking the skins of the same in a third compartment, and means cooperating with said holders for coring the articles while the articles move through said compartments.

36. In a machine of the class described, a plurality of holders for receiving the articles to be cored, means for washing, scalding and cracking the skins of the articles while on said holders, and means for coring said articles while on said holders.

37. In a machine of the class described, a traveling carrier upon which a plurality of holders are placed for receiving the articles to be cored, an enclosure over a portion of the run of said carrier, said enclosure being divided into a plurality of compartments through which the articles are passed, means for providing a series of washings of the articles as they are moved through said compartments, and means for simultaneously cooperating with said holders for coring the articles.

38. In a machine of the class described, a traveling carrier upon which a plurality of holders are placed for receiving the articles to be cored, an enclosure over a portion of the run of said carrier, said enclosure being divided into a plurality of compartments through which the articles are passed, means for providing a washing, a scalding and then a cracking of the skins of the articles as the articles are moved through said compartment, and camming means for cooperating with said holders for coring the articles.

39. In a machine of the class described, a traveling carrier upon which a plurality of holders are placed for receiving the articles to be cored, an enclosure over a portion of the run of said carrier, said enclosure being divided into a plurality of compartments through which the articles are passed, means for washing the articles in one compartment, means for scalding the articles in another compartment, means for cracking the skins of the articles in a third compartment, and means for spreading the lower ends of said holders as they move through said compartments to effect a coring of the articles on the holders.

40. In a machine of the class described, a traveling carrier, a plurality of holders on said carrier for the articles to be cored, means for cooperating with said holders to perform a coring operation, a plurality of members for removing the articles after cored from said holders and for moving them to the discharge end of the machine, and trimming knives adjacent to said discharge end for trimming the articles about the portion cored as they are moved to the discharge end of the machine.

41. In a machine of the class described, a traveling carrier, coring knives comprising a plurality of holders on said carrier for receiving the articles to be cored, means for actuating said coring knives, a plurality of moving elements for removing the articles after cored from the holders, and trimming knives over which the articles are then moved by said elements for trimming said articles.

42. In a machine of the class described, a traveling carrier, coring knives comprising a plurality of holders on said carrier for receiving the articles to be cored, means for actuating said coring knives, trimming knives, and means for moving said articles over said trimming knives upon leaving said coring knives.

43. In a machine of the class described, a traveling carrier, coring knives comprising a plurality of holders on said carrier for receiving the articles to be cored, means for actuating said coring knives, stationary trimming knives in alignment with said coring knives, the cutting edges of said trimming knives following a path of sharp angular turns in alternating directions, and means for moving the articles over said trimming knives.

44. In a machine of the class described, a traveling carrier, coring knives comprising a plurality of holders arranged in tandem relation on said carrier for receiving the articles to be cored, means for actuating said coring knives, and a pair of trimming knives adapted to receive the articles after cored from said coring knife.

45. In a machine of the class described, a traveling carrier, coring knives comprising a plurality of holders on said carrier for receiving the articles to be cored, means for actuating said coring knives, trimming knives for trimming the articles, and a plurality of laterally projecting pivotal members moving in a plane parallel to said carrier when engaging the articles to move them over said trimming knives.

46. In a machine of the class described, a traveling carrier, a series of coring knives on said traveling carrier, means for actuating said coring knives, trimming knives stationarily mounted on the machine near one end of said traveling carrier, means adjacent to said trimming knives for removing the articles upon being cored over the trimming knives for a trimming operation, said means comprising a traveling carrier having pivotal members thereon for engaging the articles.

47. In a machine of the class described, a traveling carrier, a series of coring knives on said traveling carrier for receiving the articles to be cored, means for actuating said coring knives, trimming knives at one end of said traveling carrier, means for continuing the movement of the articles over said trimming knives upon being freed from said coring knives, said means comprising a traveling carrier operating in a horizontal plane and a plurality of transverse members thereon, said members being arranged to engage the articles upon being freed from said coring knives.

48. In a machine of the class described, a traveling carrier, a series of coring knives, means for actuating said coring knives, said coring knives carried in tandem relation on said traveling carrier, a pair of trimming knives, and means cooperating with each trimming knife adapted to move the articles thereover for a trimming operation.

49. In a machine of the class described, a traveling carrier, coring knives arranged in tandem on said traveling carrier, said coring knives receiving directly the articles to be cored when fed to the machine, means for actuating said coring knives, a pair of trimming knives for trimming the articles upon being cored and removed from said coring knives, means for moving said articles over said coring knives comprising a pair of traveling carriers one for each of the pair of trimming knives, said traveling carriers being provided with pivotal members adapted to drop in back of each article as moved toward the trimming knives.

50. In a machine of the class described, a traveling carrier, coring knives arranged in tandem on said traveling carrier for receiving the articles to be cored, means for actuating said coring knives, a pair of trimming knives for trimming the articles upon being cored and removed from said coring knives, means for moving said articles over said trimming knives, said means comprising traveling carriers having members adapted to drop in back of the articles as moved toward the trimming knives.

In witness whereof, I have hereunto subscribed my name.

IVAN C. MORGAN.

Witnesses:
R. H. JUDD,
B. C. WILLIAMS.